United States Patent [19]

Higeta et al.

[11] Patent Number: 4,672,392

[45] Date of Patent: Jun. 9, 1987

[54] THERMAL HEAD FOR THERMAL PRINTER

[75] Inventors: Kazuya Higeta; Takahiro Daikoku; Kazumasa Fujioka; Isao Nakajima, all of Ibaraki, Japan

[73] Assignee: Hitachi, Ltd., Tokyo, Japan

[21] Appl. No.: 798,245

[22] Filed: Nov. 8, 1985

[30] Foreign Application Priority Data

Nov. 12, 1984 [JP] Japan ............................... 59-236609

[51] Int. Cl.[4] ......................... G01D 15/10; H05B 1/00

[52] U.S. Cl. ................................ 346/76 PH; 219/216

[58] Field of Search ..................... 346/76 PH; 219/216

[56] References Cited

U.S. PATENT DOCUMENTS 4,259,564 3/1981 Ohkubo et al. ..................... 219/216

4,517,444 5/1985 Kawahito et al. .................. 219/216

OTHER PUBLICATIONS

Anon, Electronics, "Adding Heat Sink Improves Fujitsu's Thermal Printer", vol. 49, No. 16, p. 56, Aug. 1976.

*Primary Examiner*—E. A. Goldberg

*Assistant Examiner*—Gerald E. Preston

*Attorney, Agent, or Firm*—Antonelli, Terry & Wands

[57] ABSTRACT

In order to adapt a thermal head for a thermal printer to a raised speed, the thickness δ(μm) of a heat accumulating layer in the head is set at:

$$1.3\sqrt{kt_p} \times 10^6 \leqq \delta \leqq 1.5\sqrt{kt_O} \times 10^6$$

where k: temperature conductivity of the heat accumulating layer, $t_p$: heating duration of the thermal head, and $t_O$: printing cycle of the thermal head.

6 Claims, 7 Drawing Figures

THERMAL HEAD FOR THERMAL PRINTER

BACKGROUND OF THE INVENTION

The present invention relates to a thermal head for a thermal printer, and more particularly to a thermal head which is well suited for raising a printing speed and enhancing a printing quality.

In general, a thermal head is such that, as described in U.S. Pat. No. 4,517,444, Electronics/Aug. 5, 1976, etc., a substrate made of ceramics or the like is provided with a heat accumulating layer, on the surface of which a plurality of minute heating resistors are arranged.

When the printing cycle is shortened in order to raise the printing speed of the thermal printer of this type, the next printing operation starts before the head cools completely, and the temperature rises gradually each time the printing operation is repeated. Consequently, as the printing is repeated, the printing density rises gradually. Another disadvantage is the occurrence of, e. g., the so-called trailing phenomenon in which, even after the printing has been ended, it continues for a while because the temperature of the head does not lower. Such phenomena become conspicuous when the printing cycle becomes shorter than about 5 ms, and they are very conspicuous for a printing cycle shorter than 1 ms. The reason is that the period of time to be assigned to cooling shortens as the printing cycle becomes shorter.

Such phenomena, which are very unfavorable for the thermal printer, are ascribable to the inferior thermal response characteristic of the thermal head, the cause of which is considered to lie in the heat accumulating layer. The heat accumulating layer is a kind of heat insulating layer which is disposed lest heat generated by the heating portion of the heating resistor should be radiated through the substrate of good heat conduction. Accordingly, it is greatly effective to employ a material with which the temperature conductivity k ($m^2/s$) of the heat accumulating layer becomes nearly equal to, or desirably, lower than that of a protective layer situated on the opposite side of the heat accumulating layer with the heating resistor intervening therebetween. In general, $SiO_2$, $Ta_2O_5$ etc. are employed as the materials of the protective layer, and the temperature conductivities thereof are on the order of $1\times10^{-6}$ $m^2/s$. Accordingly, the heat accumulating layer is usually made of a material difficult of conducting heat, the temperature conductivity k ($m^2/s$) of which is not higher than $1\times10^{-6}$ $m^2/s$. It is considered that, in the prior-art thermal head, the heat accumulating layer will be unnecessarily thick and will therefore act as a thermal resistance during the cooling, to induce the disadvantages mentioned before. Heretofore, the thermal characteristic of a thermal head has not been considered in regard to the thickness of the heat accumulating layer of the head.

SUMMARY OF THE INVENTION

An object of the present invention is to provide a thermal head for a thermal printer which is excellent in thermal responsiveness.

The thermal responsiveness of a thermal head depends principally upon the thickness of a heat accumulating layer. When the heat accumulating layer is too thin, a high peak temperature is not attained, whereas when it is too thick, a low cooling rate is involved though the high peak temperature is attained.

The present invention affords the optimum thickness of a heat accumulating layer. The optimum thickness δ (μm) of the heat accumulating layer is expressed as follows when the temperature conductivity of the heat accumulating layer is let be k ($m^2/s$), the printing cycle of a thermal head is let be $t_0$ (s) and the heating duration of the thermal head is let be $t_p$ (s):

$$1.3\sqrt{kt_p}\times10^6 \leqq \delta \leqq 1.5\sqrt{kt_0}\times10^6$$

where $1\times10^{-8}\leqq k\leqq 1\times10^{-6}$, $0.0002\leqq t_0\leqq 0.005$ and $0.1\ t_0\leqq t_p\leqq 0.4\ t_0$.

DETAILED DESCRIPTION OF THE INVENTION

Figure 1:
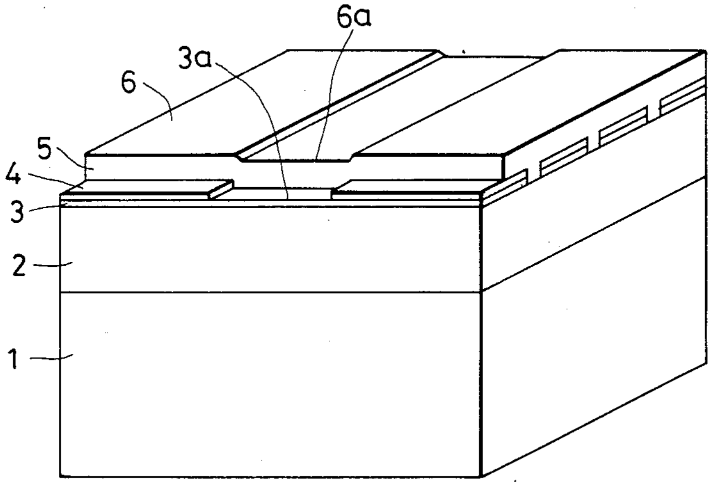
FIG. 1 is a perspective sectional view showing the essential portions of a thermal head which is an embodiment of the present invention.

The general structure of the present invention is as shown in FIG. 1. A substrate 1 made of ceramics or the like is formed with a heat accumulating layer 2, on the surface of which a plurality of minute heating resistors 3 are disposed. These heating resistors are respectively provided with electrodes or lead conductors 4 for supplying electric power. Numeral 5 designates a protective layer or protective member which consists of two layers; an oxidation-proof layer for preventing the oxidation of the heating resistors 3 and the electrodes 4, and a wear-proof layer for preventing the wear of the oxidation-proof layer. With some materials for the protective layer, a single material can serve for both the oxidation-proof layer and the wear-proof layer, and the protective layer is made up of a single layer in this case.

With the printing mechanism of a thermal printer furnished with this thermal head, when electric power is fed to the heating resistor 3 via the electrodes 4, the heating portion 3*a* of the heating resistor 3 produces heat. After passing through the protective layer 5, the heat is transmitted from the printing dot portion 6*a* of a head surface 6 to the ink layer of an inked film (not shown) to melt the ink of the ink layer and stick it on a recording medium such as a printing paper (not shown) thereby to effectuate printing, or it is transmitted therefrom to the color developing layer of a thermosensitive color developing sheet (not shown) to develop a color thereby to effectuate printing. Upon completion of the printing, the power feed to the heating resistor is cut off, and this heating resistor is sufficiently cooled to the extent that no printing is performed. Thereafter, the relative position of the thermal head and the recording medium is shifted to the next printing position (usually, a position shifted by one dot). The above series of printing operations are repeated.

Figure 2:
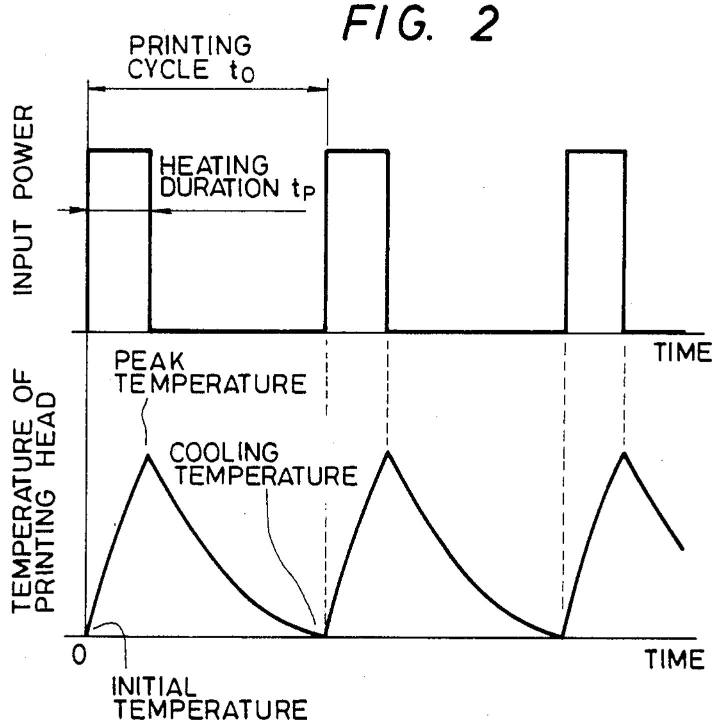
FIG. 2 is a diagram showing the relationship between input power to a heating resistor and the time variation of the temperature of a thermal head.

FIG. 2 shows the relationship between the input power to the heating resistor of the the thermal head and the temperature of the heating resistor. By the way, the temperature of the heating resistor shall be called the 'temperature of the thermal head'. The thermal head repeats heating and cooling in correspondence with the interrupted input power (heating pulses). As indicated in FIG. 2, the highest temperature of the thermal head within one printing cycle shall be called the 'peak temperature', and the temperature thereof at the end of the printing cycle shall be called the 'cooling temperature'. In order to melt the ink and transfer it on the paper or to heat the color developing layer of the thermosensitive color developing sheet and cause it to develop the color, the peak temperature of the thermal head must be, at least, higher than the melting point of the ink or the color developing temperature of the thermosensitive color developing sheet. In addition, while the thermal head moves to the next printing position after the printing operation, it must not print a dot. Therefore, the cooling temperature must be lower than the melting point of the ink or the color developing temperature of the thermosensitive color developing sheet.

Figure 3:
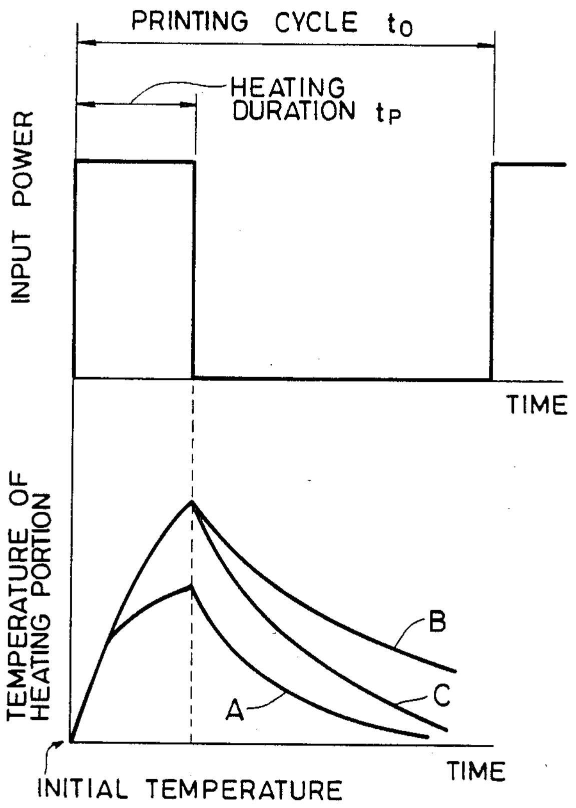
FIG. 3 is a diagram showing the differences of the thermal responsiveness of the thermal head based on the differences of the thickness of a heat accumulating layer.

The thermal responsiveness of the thermal head depends principally upon the thickness of the heat accumulating layer 2 shown in FIG. 1. FIG. 3 shows the time variation of the temperature of the thermal head with a parameter being the thickness of the heat accumulating layer, as to only the first printing period after the start of printing. When the thickness of the heat accumulating layer is too small, a high peak temperature is not attained, and a temperature variation as indicated by a curve A in the figure is exhibited. Conversely, when it is too large, the high peak temperature is attained, but the cooling rate is low and a temperature variation as indicated by a curve B in the figure is exhibited. In contrast, when the thickness of the heat accumulating layer is selected to a suitable value between the cases A and B, the temperature variation becomes as indicated by a curve C in the figure, according to which the high peak temperature is attained as in the case of the thick heat insulating layer (curve B), and moreover, the subsequent cooling rate is higher than in the case of the thick heat accumulating layer (curve B) and a low cooling temperature is attained. It is accordingly understood that the thermal responsiveness of the thermal head depends upon the thickness of the heat accumulating layer and that from the viewpoint of the thermal responsiveness of the thermal head, the thickness of the heat accumulating layer has the optimum value.

Figure 4:
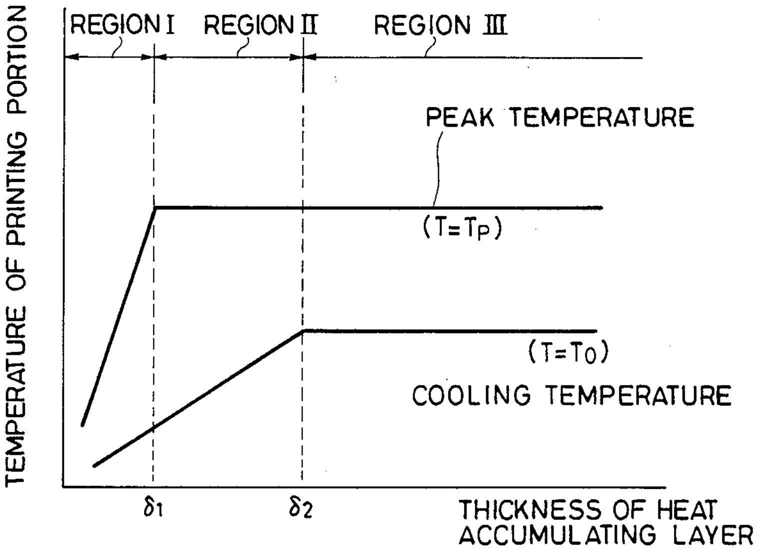
FIG. 4 is a diagram showing the relationship between the peak temperature as well as cooling temperature of the thermal head and the thickness of the heat accumulating layer.

In order to clarify the optimum value of the thickness of the heat accumulating layer, the relationship of the thickness of the heat accumulating layer with the peak temperature and cooling temperature, which characterize the thermal responsiveness of the thermal head, is illustrated in FIG. 4. This figure is a diagram in the case where only the thickness of the heat accumulating layer was varied while conditions such as the heating duration $t_p$(s), the printing cycle $t_0$(s), the input power to the thermal head, and the thicknesses of the heating portion 3*a* (refer to FIG. 1) and the protective layer remained unchanged. First, note is taken of the peak temperature. The peak temperature increases in proportion to the thickness of the heat accumulating layer, but it becomes substantially constant when the heat accumulating layer reaches a certain thickness ($\delta_1$ in the figure). The threshold value $\delta_1$ agrees with a distance by which the heat can propagate in the heat accumulating layer during the heating period of time $t_p$ (s). Accordingly, the above characteristic of the peak temperature can be interpreted as follows. In a case where the thickness of the heat accumulating layer is smaller than $\delta_1$ (the distance by which the heat can propagate in the heat accumulating layer within the heating duration tp), the heat generated by the heating resistor 3 (FIG. 1) gets to the substrate via the heat accumulating layer within the heating duration $t_p$, namely, in the course of the temperature rise of the thermal head. The heat conductivity and temperature conductivity of the substrate are much greater than those of the heat accumulating layer. Therefore, when the heat has arrived at the substrate, the substrate functions as a heat sink, and hence, the temperature of the thermal head hardly rises thenceforth. In the case of the thickness of the heat accumulating layer smaller than $\delta_1$, accordingly, the thinner the heat accumulating layer is, the earlier the heat will reach the substrate and the lower the peak temperature will become. To the contrary, in a case where the heat accumulating layer is thicker than $\delta_1$, the heat does not arrive at the substrate within the heating duration $t_p$. Accordingly, the temperature rise of the thermal head ends the moment the input power to the heating resistor has been cut off, that is, at the point of time $t=t_p$. In the case of the thickness of the heat accumulating layer greater than $\delta_1$, therefore, the temperature rise of the thermal head does not differ depending upon the thickness of the heat accumulating layer, and the peak temperatures in the range within which the heat accumulating layer is thicker than $\delta_1$ are equal. It is preferable for the thermal head that the highest possible temperature is attained when the input power is constant. Accordingly, the thickness of the heat accumulating layer should he set in the range which is greater than the threshold value $\delta_1$.

Next, note is taken of the cooling temperature (the temperature of the thermal head at the time $t=t_0$). Likewise to the peak temperature, the cooling temperature rises with the thickness of the heat accumulating layer and becomes constant when it exceeds a threshold value $\delta_2$. The threshold value $\delta_2$ is equal to a distance by which the heat can propagate in the heat accumulating layer during one printing cycle $t_0$. This can also be interpreted as in the case of the peak temperature. When the heat produced by the heating resistor has passed through the heat accumulating layer to reach the substrate, the cooling of the thermal head is promoted because the heat conductivity and temperature conductivity of the substrate are higher than those of the heat accumulating layer. When the thickness of the heat accumulating layer is smaller than $\delta_2$, the heat arrives at the substrate in one printing cycle $t_0$ and the subsequent cooling is promoted, so that a cooling temperature lower than in the case where the heat accumulating layer is $\delta_2$ thick is attained. The thinner the heat accumulating layer is, the earlier the heat reaches the substrate, and hence, the lower cooling temperature the thermal head can attain. On the other hand, in a case where the thickness of the heat accumulating layer is greater than $\delta_2$, the heat cannot get to the substrate in one printing cycle $t_0$. Accordingly, the cooling temperature becomes constant irrespective of the thickness of the heat accumulating layer. Herein, when the heat accumulating layer is thicker than $\delta_2$, the heat does not arrive at the substrate yet even at the start of the next printing cycle after the end of one printing cycle, and a further time interval is required in order to radiate the heat through the substrate. In other words, the part of the heat accumulating layer exceeding $\delta_2$ acts as a thermal resistance against the heat radiation. Accordingly, the thickness of the heat accumulating layer ought to be set, at least, smaller than $\delta_2$ in order that the heat may be radiated through the substrate simultaneously with the end of the printing cycle so as to quickly cool the thermal head.

As thus far described, the thickness of the heat accumulating layer must be set to the distance (a region 11 in FIG. 4) at which the heat generated by the heating resistor can pass through the heat accumulating layer to reach the substrate in the heating duration $t_p$ of the heating resistor or the printing cycle $t_0$ of the thermal head.

In general, a distance l (m) by which heat can propagate within a substance of temperature conductivity k ($m^2/s$) in a time interval t (s) is expressed by:

$$l = C\sqrt{kt} \quad (C\text{: constant}) \tag{1}$$

Accordingly, letting k ($m^2/s$) denote the temperature conductivity of the heat accumulating layer, $t_0$ (s) denote the printing cycle, and $t_p$ (s) denote the heating duration of the heating resistor, the aforementioned $\delta_1$ ($\mu$m) (the distance by which the heat can propagate within the heat accumulating layer in the heating duration $t_p$) and $\delta_2$ ($\mu$m) (the distance by which the heat can propagate within the heat accumulating layer in the printing cycle $t_0$) can be respectively expressed as:

$$\left.\begin{aligned} \delta_1 &= C_1\sqrt{k\,t_p} \\ \delta_2 &= C_2\sqrt{k\,t_0} \end{aligned}\right\} \tag{2}$$

It was planned to evaluate $\delta_1$ and $\delta_2$ with experiments and numerical analyses, using the temperature conductivity k ($m^2/s$) of the heat accumulating layer, the printing cycle $t_0$ (s) and the heating duration $t_p$ (s) as parameters and to determine $C_1$ and $C_2$ in Eq. (2) from the results thereof. In this regard, since the temperature conductivity k ($m^2/s$) of the heat accumulating layer ought to be nearly equal to, or desirably, lower than that of the protective layer as stated before, the experiments and analyses were conducted as to cases where it was not greater than $1\times10^{-6}$ $m^2/s$. In addition, the temperature conductivities of existing substances are approximately $1\times10^{-8}$ $m^2/s$ in the least. Therefore, the range of study on the temperature conductivities k ($m^2/s$) was:

$$1\times10^{-8}<k<1\times10^{-3}$$

As stated before, the influence of the thickness of the heat accumulating layer begins to appear when the printing cycle is shorter than about 5 ms, and it becomes very conspicuous when the printing cycle is shorter than 1 ms. Besides, since the magnitude of the input power to the thermal head is determined by the withstand voltage characteristic of the thermal head, it is subject to a limit that the input power is increased to shorten the heating time interval. Accordingly, the printing cycle is naturally limited. The limit was considered to be about 0.0002 s, and the range of study on the printing cycles tO (s) was set to:

$$0.0002<t_0<0.005$$

Considering also a time interval to be assigned to the cooling, the heating duration tp (s) was set to:

$$0.1\,t_0<t_p<0.4\,t$$

From the results of studies within the above ranges, optimum thickness $\delta$ ($\mu$m) of the heat accumulating layer has been revealed to be expressed as follows, when the temperature conductivity of the heat accumulating layer is let be k ($m^2/s$), the printing cycle is let be $t_0$ (s) and the heating duration is let be $t_p$ (s):

$$1.3\sqrt{kt_p}\times10^6 \leqq \delta \leqq 1.5\sqrt{kt_0}\times10^6$$

where
$1\times10^{-8}\leqq k\leqq1\times10^{-6}$,
$0.0002\leqq t_0\leqq0.005$, and
$0.1\,t_0\leqq t_p\leqq0.4\,t_0$.

Now, a practicable embodiment of the present invention will be described with reference to FIGS. 5–7.

Figure 5:
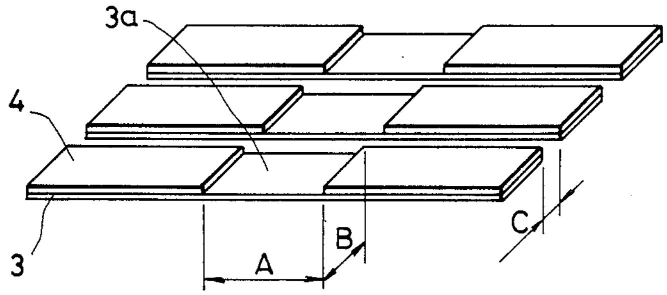
FIGS. 5 to 7 are diagrams showing an example of the present invention and the experimental values of the temperatures of the thermal head in the case of operating the example.
Figure 6:
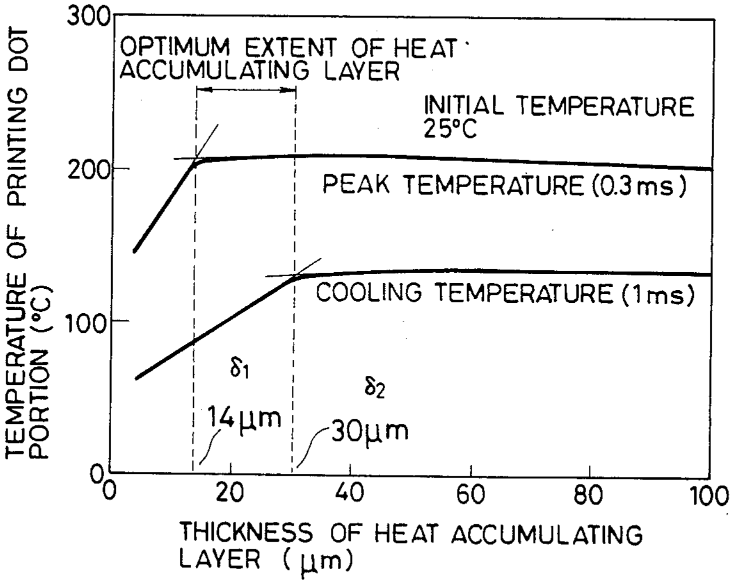

FIG. 5 shows the dimensions of the major portions of the embodiment of the present invention. The general structure of the present invention is as shown in FIG. 1. As shown in FIG. 5, the thickness of a heating resistor was 0.1 $\mu$m, the size of a heating portion 3a was $A\times B=158$ $\mu$m$\times133$ $\mu$m, and the spacing between the adjacent heating resistors was C=25 $\mu$m. A protective layer was constructed of two of $SiO_2$ and $Ta_2O_5$, which were respectively 3.5 $\mu$m and 4.5 $\mu$m thick. The temperature conductivity of a heat accumulating layer was $4.0\times10^{-7}$ $m^2/s$. Shown in FIG. 6 are the experimental results of the peak temperature and the cooling temperature in the first printing cycle as obtained when the thickness of the heat accumulating layer of the thermal head was varied over 5 $\mu$m–100 $\mu$m under the conditions of a printing cycle $t_0$ of 1 ms, a heating duration $t_p$ of 0.3 ms and an input power of 1 W for each heating resistor. In the light of this diagram, the optimum range of the heat accumulating layer is from 14 $\mu$m to 30 $\mu$m. Meanwhile, the optimum range of the heat accumulating layer determined by Eq. (2) is also from 14 $\mu$m to 30 $\mu$m, which agrees with the above.

Figure 7:
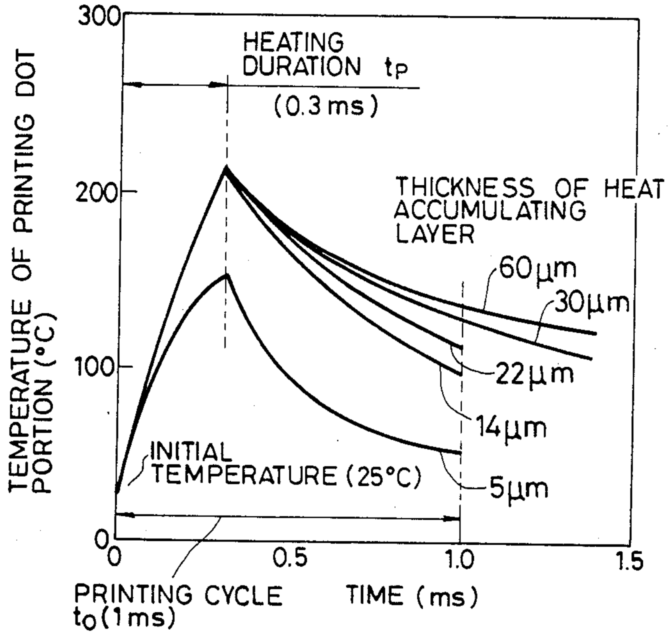

FIG. 7 illustrates the temperature variations of the thermal head in the first printing cycle after the start of printing in order to compare the thermal responsiveness afforded when the heat accumulating layer of the thermal head shown in FIG. 5 was set within the range of the optimum value, with those in the cases where the heat accumulating layer was thinner and thicker than the optimum value. It is seen that the thermal responsiveness is more excellent in the case where the thickness of the heat accumulating layer was 14 $\mu$m, 22 $\mu$m or 30 $\mu$m falling within the range of the optimum value (14–30 $\mu$m), than in the cases where it was thinner (5 $\mu$m) and thicker (60 $\mu$m) than the optimum value. In the case where the thickness of the heat accumulating layer is 30 $\mu$m, the difference of the thermal responsiveness within the printing cycle from the case of 60 $\mu$m is not so conspicuous as those from the cases of 14 μm and 22 μm. However, when the temperature variations after the end of the printing cycle are compared, the cooling rates are greatly different, and it is understood that the cooling performance is much better in the case of 30 μm than in the case of 60 μm. In the actual printing, when one heating dot is noticed, it does not always generate heat in each printing operation. In this regard, the cooling performance after the end of the printing cycle is very important.

What is claimed is:

1. In a thermal head for a thermal printer wherein a substrate is overlaid with a heat accumulating layer whose temperature conductivity k ($m^2/s$) is $1\times10^{-8}<k<1\times10^{-6}$, one or more heating resistors, electrodes which are disposed for each of the heating resistors, and a protective layer which serves to prevent oxidation and wear of the heating resistors and the electrodes, the thermal printer having means to set or control a printing cycle $t_0$ (s) so as to become $0.0002<t_0<0.005$ and a heating duration $t_p$ (s) of the thermal head for printing so as to become a value between 10–40% of the printing cycle $t_0$ (s); a thermal head for a thermal printer characterized in that a thickness δ (μm) of said heat accumulating layer is:

$$1.3\sqrt{kt_p}\times10^6\leqq\delta\leqq1.5\sqrt{kt_0}\times10^6.$$

2. A thermal head for a thermal printer as defined in claim 1, wherein the thickness of said heat accumulating layer is 14–30 μm.

3. A thermal head for a thermal printer as defined in claim 1, wherein said heat accumulating layer has a uniform thickness δ extending over said substrate.

4. In a thermal printer having a thermal head and means for controlling a printing cycle $t_0$(s) of the thermal head to be no greater than 5 ms and within a range of $0.0002<t_0\leqq0.005$ and a heating duration $t_p$(s) of the thermal head printing to be a value in a range of 10–40% of the printing cycle $t_0$(s), the thermal head comprising means for enabling a peak temperature and cooling rate of the thermal for ensuring proper printing by the thermal head for the printing cycle and heating duration, a substrate, at least one heating resistor, electrodes, and a protective layer, the peak temperature and cooling rate enabling means including a heat accumulating layer having a temperature conductivity k($m^2/s$) in a range of $1\times10^{-8}<k<1\times10^{-6}$ and a thickness δ(μm) having a predetermined relationship to the printing cycle, the heating duration and the temperature conductivity, the heat accumulating layer overlying the substrate, the at least one heating resistor being disposed on the heat accumulating layer, the electrodes being disposed on the at least one heating resistor, and the protective layer overlying at least the at least one heating resistor and the electrodes, wherein the thickness δ(μm) of the heat accumulating layer is determined in accordance with the relationship:

$$1.3\sqrt{kt_p}\times10^6\leqq\delta\leqq1.5\sqrt{kt_0}\times10^6.$$

5. A thermal head for a thermal printer as defined in claim 4, wherein the heat accumulating layer has a uniform thickness δ extending over the substrate.

6. A thermal head for a thermal printer as defined in claim 4, wherein the thickness of the heat accumulating layer is 14–30 μm.

* * * * *